Jan. 31, 1967    F. GASCHE ETAL    3,301,579
INTERRUPTED CONNECTION
Filed Nov. 25, 1964    2 Sheets-Sheet 1
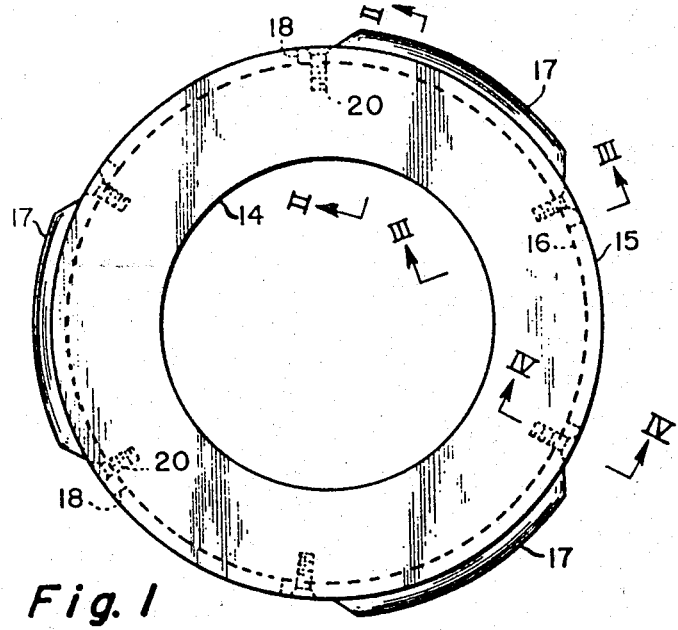
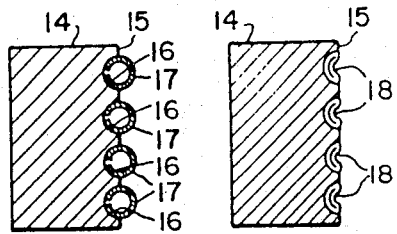
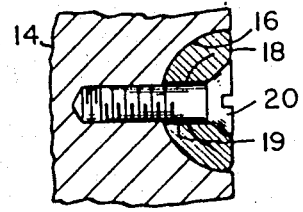
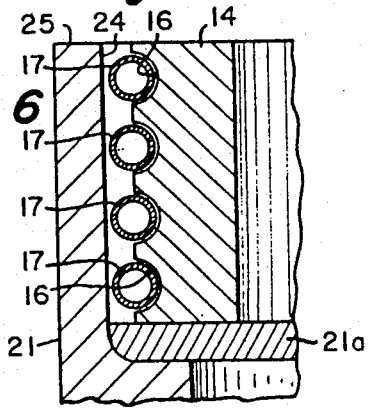
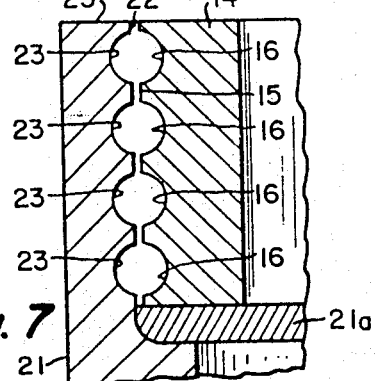
INVENTORS.
Fred Gasche
Edward H. Epprecht
BY
*Webb Burcher Robinson + Webb*
THEIR ATTORNEYS INVENTORS.
Fred Gasche
Edward H. Epprecht
BY
THEIR ATTORNEYS United States Patent Office 3,301,579
Patented Jan. 31, 1967

3,301,579
INTERRUPTED CONNECTION
Fred Gasche and Edward H. Epprecht, Erie, Pa., assignors to Autoclave Engineers, Inc.
Filed Nov. 25, 1964, Ser. No. 413,844
2 Claims. (Cl. 285—391)

This application relates to an interrupted connection for joining two cylindrical telescoping bodies whereby the bodies may be securely engaged against extremely large forces tending to separate the bodies in a direction along their common axis. At the same time the bodies can be easily and quickly disengaged when desired. Our interrupted connection is particularly useful for pressure vessels which are closed by a cover held in closed position by a nut which is threaded into the body of the pressure vessel.

Pressure vessels, particularly those used in experimental work, are subjected to extreme and cycling variations in temperature and pressure, and, as is well known, in conventional screw-threaded connections extreme stresses are set up on the first thread and the stresses decrease in succesive threads. Because of the extreme and cycling variation in temperature and pressure, and because of the stress concentration at the first thread, conventional pressure vessels cannot be subjected to temperatures and pressures as high as desired in present experimental work.

It is also highly desirable that pressure vessels be opened and closed quickly. A continuous thread engagement requires considerable time to open and close a pressure vessel, and, therefore an interrupted thread engagement has been proposed. However, conventional interrupted thread engagements are still subject to high stress concentrations on the first threads.

Our interrupted connection embodies the principle of the interrupted thread so that two cylindrical telescoping bodies (e.g. a pressure vessel and a closure-holding nut connected to the vessel) can be quickly and easily engaged and disengaged. However, the thread segments which carry the load of the connection between the two bodies are resilient, so that the load imposed on the first thread segment compresses that segment in the direction of disengagement of the two bodies and a part of the load is transmitted to the next thread segment, which in turn is compressed, transmitting a part of the load to the next thread segment and so on. In this manner the load tending to separate the two bodies at the connection is distributed over all of the thread segments making up the connection. This greatly reduces the stress concentration formerly imposed on the first thread segment in conventional threaded connections.

In the accompanying drawings we have illustrated certain presently preferred embodiments of our invention in which FIGURE 1 is a plan view of a nut used for securing a closure in a pressure vessel;

FIGURE 2 is a section along the lines II—II of FIGURE 1;

FIGURE 3 is a section along the lines III—III of FIGURE 1;

FIGURE 4 is a section along the lines IV—IV of FIGURE 1 but on an enlarged scale;

FIGURE 5 is a plan view of the top of a closure vessel with a nut such as that shown in FIGURE 1 positioned within it, the nut being in the disengaged position in the closure vessel;

FIGURE 6 is a section along the lines VI—VI of FIGURE 5;

FIGURE 7 is a section along the lines VII—VII of FIGURE 5;

Figure 8:
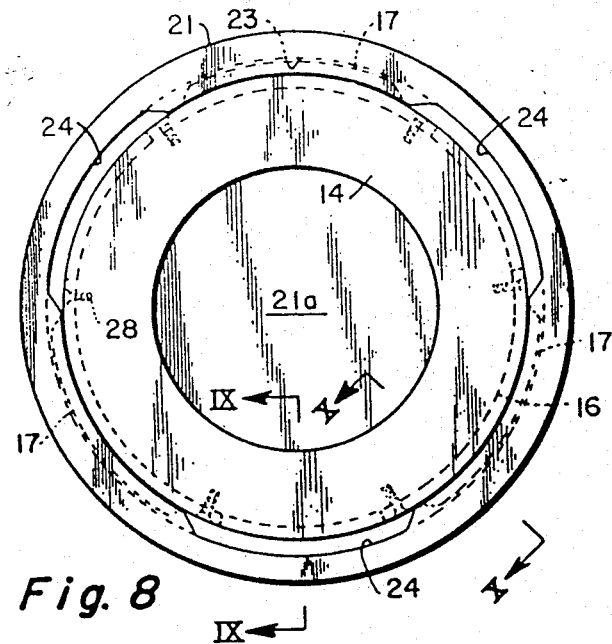
FIGURE 8 is a plan view of the nut and closure vessel of FIGURE 5 showing the parts in the engaged position.

FIGURE 1 shows a nut which may be used to hold a closure member in a pressure vessel and which has part of an interrupted connection for securing it to a pressure vessel in accordance with our invention. The nut is a cylindrical body 14 having on its outer surface 15 a plurality of grooves 16 which extend around this surface. Each of the grooves 16 has within it a plurality of resilient tubular members 17 which, as shown in FIGURE 2, may be C-shaped in cross-section. The elements 17 are spaced from each other in the grooves 16 and adjacent their ends 18 they are flattened as shown in FIGURE 3.

FIGURE 4 shows how the elements 17 are secured within the grooves 16. Holes 19 are formed in the flattened ends 18 and machine screws 20 are passed through these holes and threaded into the cylindrical body 14.

FIGURE 5 shows an assembly of a nut 14 such as that shown in FIGURES 1 to 4 inclusive positioned within the top of a pressure vessel 21 but disengaged from the vessel. The top of the pressure vessel is a cylindrical body having an inner surface 22 within which the nut 14 telescopes to engage a closure 21a for the vessel.

As shown in FIGURES 5 and 7, the surface 22 has grooves 23 which equal in number the grooves 16 in the nut 14 and are positioned opposite to the grooves 16 when the nut is within the pressure vessel in position to be engaged with the pressure vessel. The opposed grooves form passages extending around the opposed surfaces of the nut and pressure vessel into which the tubular member 17 may be inserted to engage the two bodies as is later described.

The pressure vessel 21 also has passageways 24 in its surface 22 which extend axially and inwardly from an end 25 of the vessel beyond the nut when it is in position to be engaged with the pressure vessel. These passageways are equal in number to the tubular elements 17 on the nut 14 and are spaced in the same manner around the surface 22 of the pressure vessel as the tubular members 17 are spaced around the nut. They are at least equal in width to the length of the tubular members and have a radial depth at least equal to the depth of the grooves 23.

Figure 9:
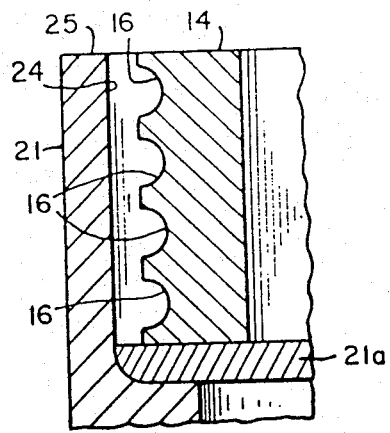
FIGURE 9 is a section along the lines IX—IX of FIGURE 8.

When the nut is to be inserted in the pressure vessel, it is oriented so that the portions of the tubular members 17 which extend outwardly from the surface 15 of the nut may slide in the passageways 24 and thereby the nut can telescope within the pressure vessel. After the nut has been inserted into the pressure vessel to the point where the grooves 16 on the nut are opposite to the grooves 23 in the pressure vessel, the nut is rotated so as to bring the resilient elements 17 in the passages formed by the grooves 16 and the portions of the grooves 23 between the pasageways 24 as shown in FIGURES 8 to 10 inclusive and thereby engage the nut with the pressure vessel so that pressure within the vessel cannot lift the closure 21a.

Figure 10:
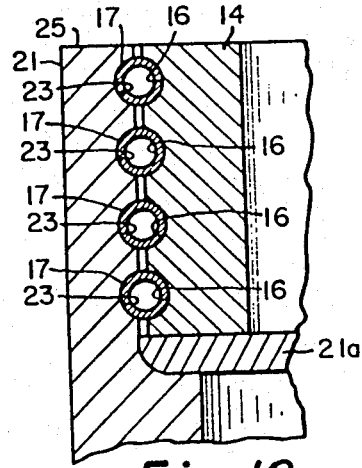
FIGURE 10 is a section along the lines X—X of FIGURE 8.

As shown in FIGURE 10, the resilient members 17 act as threads and carry the axial load imposed by pressure within the pressure vessel on the closure 21a and thereby on the nut 14. Because the tubular members 17 are resilient, stress imposed on the first inner "thread" or tubular member 17 compresses that member and thereby some of the stress is passed on to the next "thread" and so on to the remaining "threads" and thereby the high stress concentration on the first thread is greatly reduced.

It should here be noted that the resilient tubular members 17 shown in FIGURES 5 and 7 differ slightly from those shown in FIGURES 1 and 3. The tubular members of FIGURES 5 and 7 are fully cylindrical tubes, whereas, the tubular members in FIGURES 1 and 3 are C-shaped in cross-section. In both instances the tubular members have cross-sectional shapes which substantially conform to the cross-sectional shape of the passage formed by the opposed grooves 16 and 23.

To open the pressure vessel, all that is required is that the nut 14 be turned so as to line up the portions of the tubes 17 which extend beyond the surface 15 of the nut with the axially extending passageways 24. The nut can then be withdrawn axially from the pressure vessel.

In FIGURES 5 to 10 the passages for the tubular elements formed by the grooves in the cylindrical bodies are shown as separate concentric annular pasages. If it is desired to exert pressure axially between the two bodies as they are engaged; for example, if it is desired to exert inward pressure on the closure 21a, as the nut is turned to engage it in the pressure vessel, the grooves in the nut and in the pressure vessel could be in the form of a continuous helical grove forming a continuous helical passage for the resilient tubular elements.

Also the pasageways and tubular members have been shown as circular in cross-section. The passages may have other cross-sectional shapes, for example, elliptical.

Figure 11:
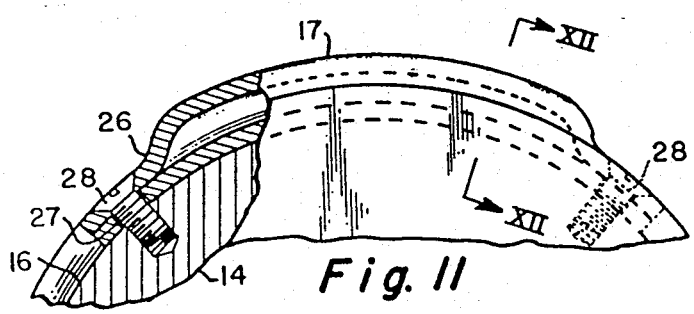
FIGURE 11 is a side view partially in section showing one form of resilient thread segment used in our invention.
Figure 12:
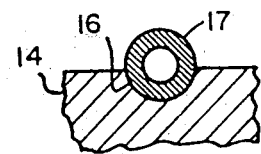
FIGURE 12 is a section along the lines XII—XII of FIGURE 11.

FIGURES 11 and 12 show a resilient tubular member such as that shown in FIGURES 5 to 10 inclusive and a manner in which it may be secured in a grove 16 in the nut 14. The resilient element is a resilient, hollow metal tube which is flattened at its ends 26. Holes 27 are formed in the flattened ends and a machine screw 28 is passed through the hole 27 and threaded into the nut 14.

Figure 13:
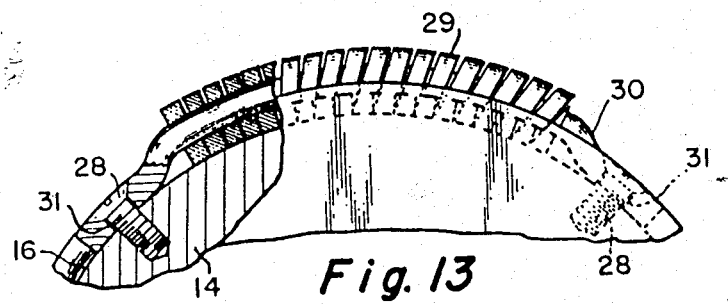
FIGURE 13 is a side view partially in section of another form of resilient thread segment.

FIGURE 13 shows another form of resilient tubular member which may be used as a resilient thread in our interrupted connection. The resilient tubular member shown in FIGURE 13 comprises a helical coil 29 made of wire which preferably is square in cross-section after it has been formed into a coil, so as to obtain the maximum area of contact between the resilient tubular member and the surfaces of the opposed grooves 16 and 23 in the nut and pressure vessel. As shown in FIGURE 13, the individual coils of the spring are also close together to obtain as much strength and area of contact as possible.

A rod 30 passes through the helical spring 29 and extends beyond the spring at both of its ends. The portions of the rod 30 which extend outside the spring have holes 31 through which machine screws are passed and threaded into the nut 14 in the same manner as the machine screws 28 shown in FIGURE 11.

Instead of the helical spring 29, short segments can be threaded on the rod 30 after which it is secured to the nut 14 as described above. These segments can be circular, C-shaped or elliptical in cross-section.

In all of the embodiments so far described, the resilient tubular elements have been positioned in grooves in the nut or inner cylindrical body and secured thereto. Obviously, the parts could be reversed, that is, the resilient tubular members could be secured in the grooves 23 in the pressure vessel, and the pasageways 24 could be formed in the nut 14.

From the foregoing it is apparent that we have invented an interrupted connection for joining two cylindrical telescoping bodies by which the two bodies can be quickly and easily engaged and disengaged. Because of the resilient threads, the connection is capable of withstanding extreme and cycling variations in pressure and temperature. An important advantage also arises from our form of interrupted connection in that the grooves on only one of the two cylindrical bodies need be interrupted, whereas, in conventional interrupted thread connections, the threads on both bodies must be interrupted. Thereby we avoid difficult machining operations.

While we have described certain presently preferred embodiments of our invention, it is to be understood that it may be otherwise embodied within the scope of the appended claims.

We claim:
1. An interrupted connection for joining two cylindrical telescoping bodies comprising,
   (A) two cylindrical telescoping bodies,
   (B) opposed circumferential grooves of the same size and shape in the opposed surfaces of said bodies and together forming at least one passage extending around said opposed surfaces,
   (C) resilient tubular members positioned in and spaced circumferentially from each other in said passage and comprising short segments each segment having a longitudinally extending bore therethrough radially spaced from the inner periphery of the groove in said one of said bodies and a rod in said bore extending therethrough and beyond the ends of each segment, said rod being secured at its ends in the groove to said one of said bodies,
   (D) said tubular members having a cross-sectional shape which substantially conforms to the cross-sectional shape of said passage, and
   (E) passageways in the surfaces of the body opposed to the groove in which the tubular members are secured, said passageways extending axially from one end of said body, being equal in number to the tubular members and spaced around the surface in the same manner as the tubular members are spaced in the groove to which they are secured and having a width at least equal to the length of said tubular members and a radial depth at least equal to the depth of said grooves.
2. An interrupted connection as described in claim 1 in which said short segments are helical springs.

References Cited by the Examiner

UNITED STATES PATENTS

| | | | |
|---|---|---|---|
| 439,048 | 10/1890 | Anderson. | |
| 737,638 | 9/1903 | Lazareff | 285—376 |
| 906,217 | 12/1908 | Gaylord | 285—391 |
| 1,489,809 | 4/1924 | Austin. | |
| 3,062,568 | 11/1962 | Anderson et al. | 285—333 |
| 3,104,583 | 9/1963 | Gasche | 85—46 |

CARL W. TOMLIN, *Primary Examiner.*

D. W. AROLA, *Assistant Examiner.*